United States Patent [19]
Fabry

[11] 3,910,107
[45] Oct. 7, 1975

[54] APPARATUS FOR RUNNING-IN AND AUTOMATICALLY TESTING ELECTRICALLY ACTUATED CLUTCHES

[75] Inventor: Donald F. Fabry, Garden City, Mich.

[73] Assignee: Burroughs Corporation, Detroit, Mich.

[22] Filed: Apr. 1, 1974

[21] Appl. No.: 456,527

[52] U.S. Cl. .................................. 73/118; 340/271
[51] Int. Cl.² ...................................... G01M 13/02
[58] Field of Search ....... 74/118, 136 R; 340/213 R, 340/271

[56] References Cited
UNITED STATES PATENTS
3,052,117  9/1962  Miller et al. ................. 73/136 R
3,293,548  12/1966  Hunt .............................. 340/271 X

*Primary Examiner*—Jerry W. Myracle
*Attorney, Agent, or Firm*—Michael B. McMurry; Edwin W. Uren; Paul W. Fish

[57] ABSTRACT

In order to automatically first, run in and then test the performance of electrically actuated clutches an apparatus has been developed which includes: a motor for driving the clutch; a pulse generator for generating pulses representative of the number of revolutions of the motor; hysteresis brakes and flywheel for providing a load to the clutch; and an optical encoder for measuring the rate of rotation of the load portion of the clutch. In addition to having electronic circuitry for automatically controlling the clutch actuating voltage and measuring the response of the clutch, the circuitry includes a counter for timing the length of the run-in; a counter for timing the length of the cooling period before the start of the performance test and associated circuitry for controlling the run-in and starting the performance test at the completion of the cooling period. Also circuitry is included to reduce the load on the clutch during the release portion of the test.

11 Claims, 9 Drawing Figures

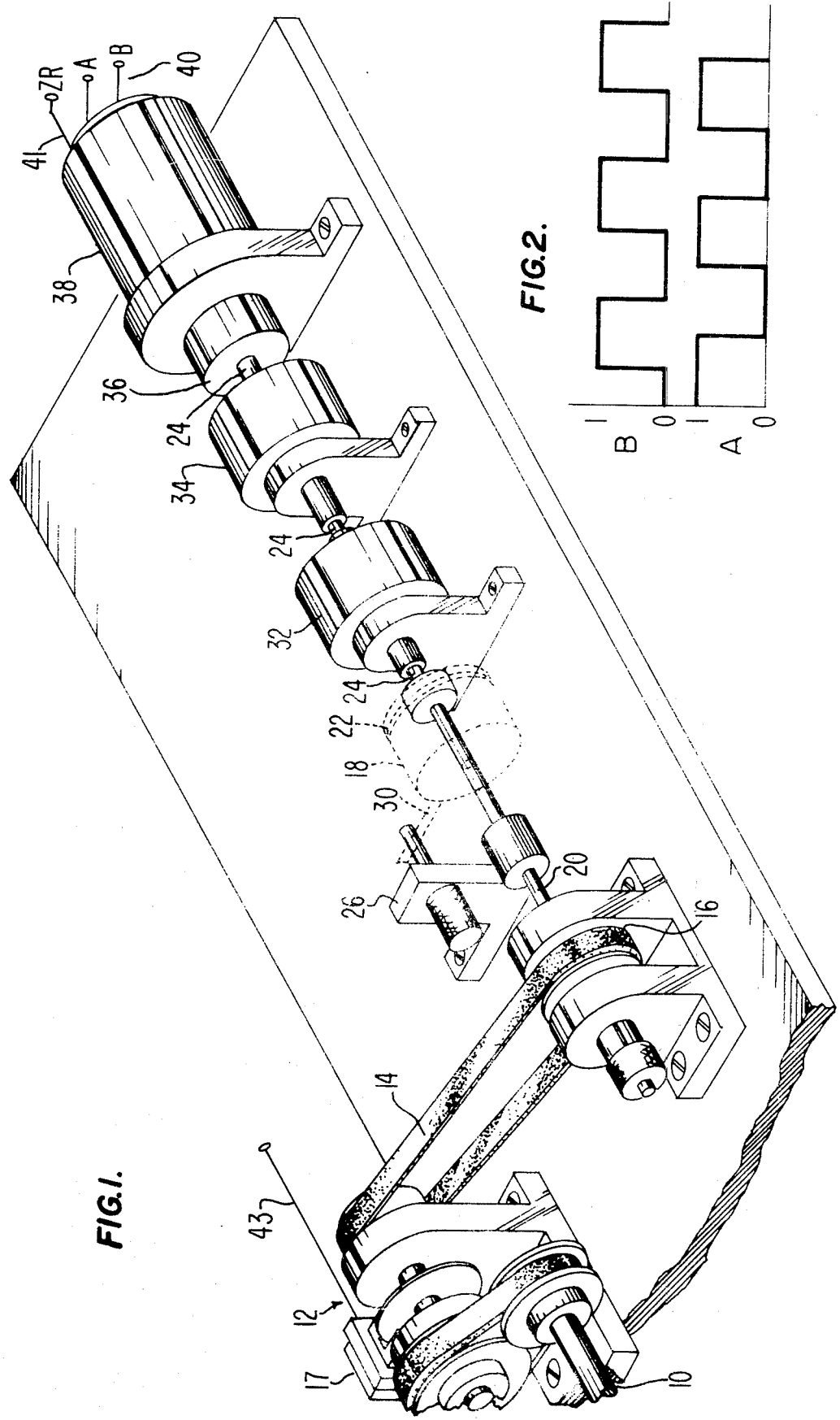

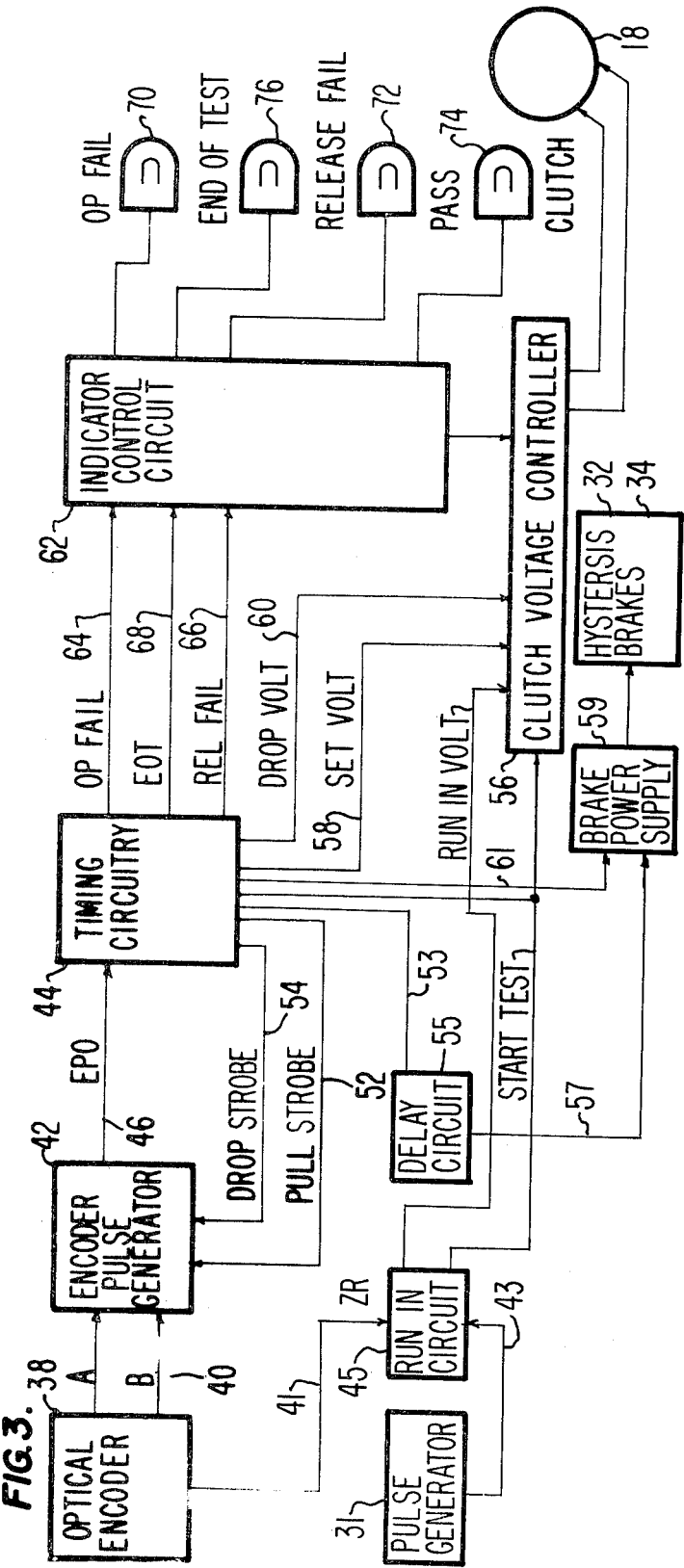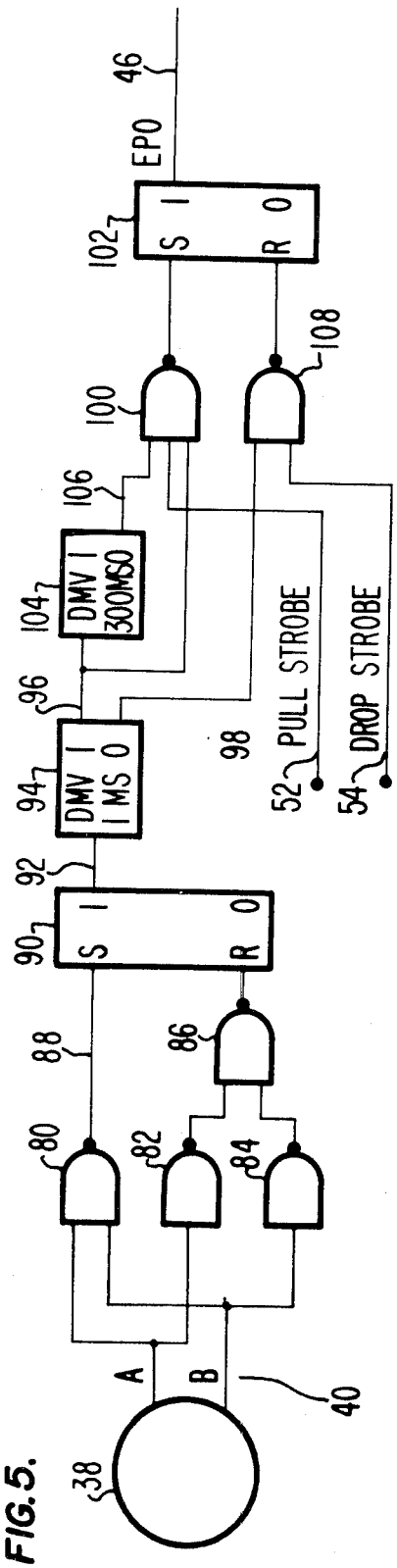

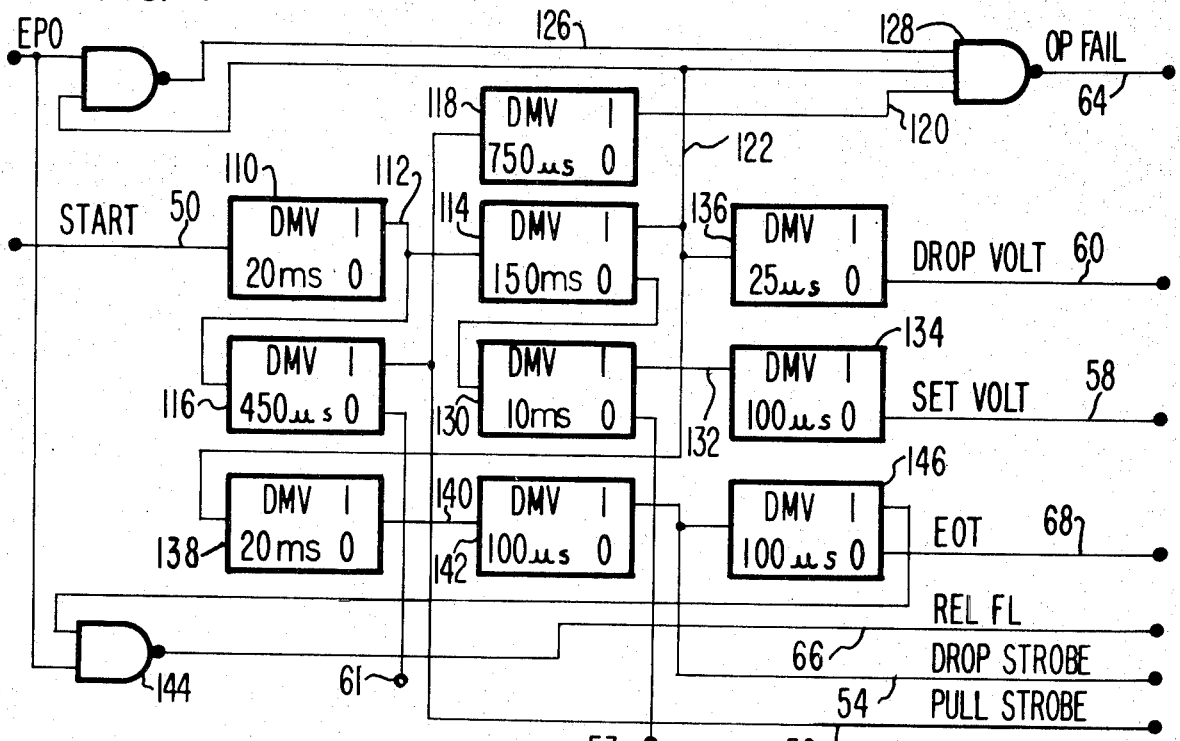
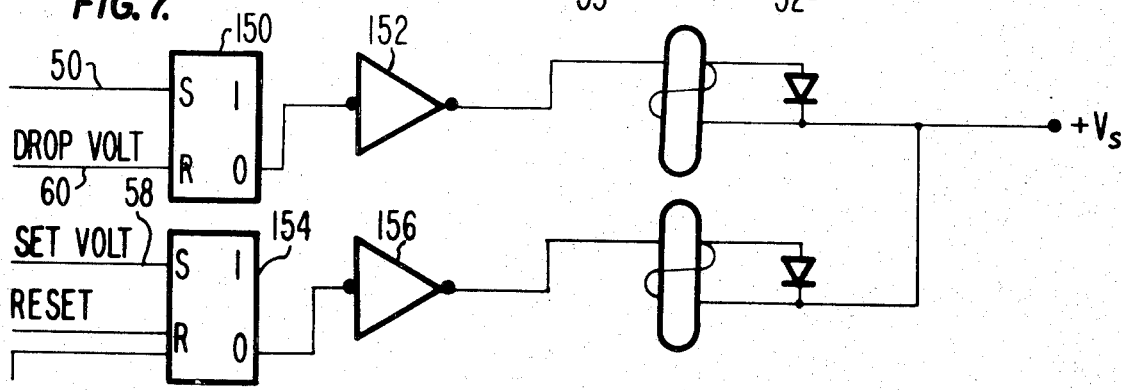
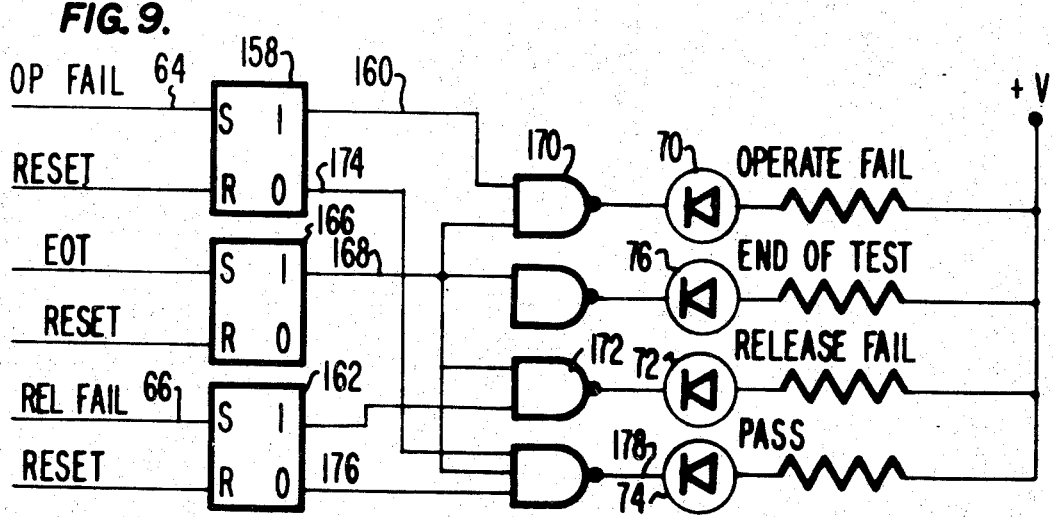

APPARATUS FOR RUNNING-IN AND AUTOMATICALLY TESTING ELECTRICALLY ACTUATED CLUTCHES

BACKGROUND OF THE INVENTION

This invention relates to the field of integrated test apparatus for electro-mechanical devices. More particularly this invention is an improvement on the Apparatus for Testing Electrically Actuated Clutches Ser. No. 405,166 now U.S. Pat. No. 3,845,479 filed Oct. 10, 1973 by the same inventor andwhich is assigned to the assignee of the present application such disclosed apparatus providing for the automatic run-in of the clutch before it is tested for performance.

In testing clutches for use in electro-mechanical apparatus of various types there are two primary operational characteristics that are of sufficient importance to warrant testing. The first of these characteristics is the "pick-up time", which is the amount of time after the clutch has been energized that it takes the load portion of the clutch to reach a predetermined speed. This test is usually performed with the minimum actuating voltage likely to be applied to the clutch in the actual end product in which it will be used.

The second test is a measure of the "release time" or the time which is required for the load portion of the clutch to stop rotating after the actuating voltage to the clutch has been cut off. For the most practical test of the release time, the maximum likely actuating voltage, to which the clutch in the final product will be subjected, should be applied to the clutch for a significant amount of time before the voltage is cut off.

However, before a clutch can be tested realistically for these characteristics, it should be run-in in order to burnish the clutch faces so that the coefficient of friction of the clutch faces will be approximate the same as those under actual operating conditions. If the tests are conducted before burnishing the smooth faces of the clutch, the measure of the "pick-up time" and the "release time" will not correspond to the performance of the clutch under actual operating conditions. The running-in of the clutch at this point has the additional advantage of preparing the clutch so that when it is placed in the final product it will operate as designed from the very start.

Prior to the development of this test apparatus it was necessary to test each of these responses separately, often using an oscilloscope or some other means that required operator interpretation. Since the actual testing of each one of the clutches in a production environment using the prior art methods was time consuming and expensive, usually only the pick-up time of the clutch was tested and no provision for run-in was made. However, due to the fact that operating characteristics of various electro-mechanical products such as accounting machines, mini-computers and the like involve increasingly faster and more accurate response, the need for assuring the operation of the electro-mechanical components within design tolerances has become of significant economic importance.

The improvement to the aforementioned Apparatus For Testing Electrically Actuated Clutches as disclosed in U.S. Pat. No. 3,845,478, also includes a means of varying the load on the driven portion of the clutch. It was discovered that a more meaningful measure of the release time could be taken if the load on the clutch was substantially reduced since a heavy load on the clutch would force an almost immediate release even where the clutch was defective. In order to provide for a more meaningful release test, circuitry is included to reduce the load on the clutch during the release portion.

SUMMARY OF THE INVENTION

It is accordingly an object of the invention to provide a means of automatically running-in a clutch prior to testing the pick-up and release time.

It is an additional object of the invention to provide an electronic circuit to control the voltage applied to the clutch during the run-in time and the cooling time for the clutch.

It is a further object of the invention to provide a circuit for varying the load on the clutch so that during the release portion of the test the load on the clutch is less than during the pick-up portion.

The test apparatus includes both a mechanical portion and an electronic portion. The mechanical portion of the test apparatus includes a motor for driving the clutch at a predetermined speed and a transmission means for transmitting the rotation of the motor to the clutch. The mechanical portion also includes a fixture for securing the clutch and hysteresis brakes in combination with a flywheel for applying a load to the clutch. In addition there is an optical encoder attached to the load end of the clutch for measuring the rate of rotation of the load portion of the clutch and a photo-electric pulse generator attached to the motor for counting such revolution of the motor.

The second portion of the test apparatus is composed of an electronic circuit for running-in the clutch; monitoring the speed of the load portion of the clutch; controlling the application of voltage to the clutch; and indicating whether the clutch has passed or failed the test. The circuit includes an encoder pulse generator which receives the output of the optical encoder. The encoder pulse generator generates a signal indicative of whether the clutch has reached a predetermined speed during the pick-up portion of the test or whether the load portion of the clutch has decreased below a predetermined speed during the release portion of the test. The encoder also generates a zero reference (ZR) signal that indicates when the load portion has made a complete revolution.

The electronic circuitry has a "run-in counter" responsive to the pulse generator and the ZR signal from the encoder for timing the run-in of the clutch and a "cooling counter" for timing the cooling of the clutch before the actual tests are started.

Included also is a timing circuit that is responsive to the encoder pulse generator. This circuit has a number of functions including timing the various portions of the test and providing signal to the encoder pulse generator to direct the encoder pulse generator to produce a signal for use in either the pick-up or release portion of the test.

There is also a clutch voltage controller circuit that has as its functions; the actuation of the clutch at a minimum actuating voltage during the pick-up portion of the test; the application to the clutch of a maximum voltage just before the release portion of the test is performed; and then the removal of the voltage from the clutch during release portion of the test. Similarly, a load control circuit is provided to reduce the load on the clutch prior to the release portion of the test.

An additional portion of the test circuitry consists of an indicator control circuit also responsive to signals from the timing circuit. This portion of the test circuitry will cause an "operate fail lamp" to light if the clutch does not pick up to the predetermined speed in the specified time during the pick-up portion of the test. Similarly the indicator circuit will light the "release fail lamp" if the clutch does not release within the specified time during the release portion of the test. This circuit also controls an "end of test lamp" and a "pass lamp".

The operation of the test apparatus begins with the insertion of a clutch in the test fixture. The drive portion of the clutch is connected to the drive motor by means of the transmission so that the drive portion of the clutch will be driven at a constant speed. The lead portion of the clutch is connected to the hysteresis brakes and flywheel which will provide a known load to the clutch.

In the first phase of its operation a voltage is applied to the clutch sufficient to cause a burnishing effect. The run-in counter times this run-in portion by counting the number of revolutions of the motor which is turning at a constant rate. Also if the faces of the and which should become sufficiently burnished to cause the load portion of the clutch to rotate before the run-in counter times out, the circuitry will respond to the ZR signal and terminate the run-in. After the run-in is completed, the cooling cycle begins wherein the cooling counter similarly responding to the motor pulse generator times the cooling of the clutch.

When the test begins the timing circuit transmits a signal to the clutch voltage controller that will cause the controller to apply the actuating voltage to the clutch. The actuating voltage will result in the drive portion of the clutch engaging with the load portion. If the speed of the load portion of the clutch does not reach the predetermined rate within the specified time, as measured by the timing circuit, an "operator fail" flip flop in the indicator control circuitry will be set.

After the time for reaching the predetermined speed, and after the pick-up portion of the test has elapsed the timing circuit will cause the clutch voltage controller, during a time delay for shifting the conditions for drop-out, to apply the maximum actuating voltage to the clutch. This "maximum actuating voltage" represents the highest voltage that the clutch is likely to encounter in the actual end product. At the same time the power supply to the hysteresis brake will be disconnected and reconnected after the power supply has been reduced so as to place a lighter load on the clutch.

When the clutch has been given sufficient time to react to the maximum voltage, the actuating voltage will be removed from the clutch. The timing circuit in combination with the encoder pulse generator will then determine if the clutch has stopped rotating within the specified time. If it has not, a "release fail" flip flop in the indicator control circuit will be set.

At the termination of the test as determined by the timing circuit, an "end of time" signal will be sent to the indicator control circuit in order to activate the indicator control lamps. If the clutch has failed to pick up within the specified time, the operator fail lamp will light or if the release of the clutch has not occurred during the specified time, the release fail lamp will light. If, on the other hand, the clutch under test has passed both the tests, the pass lamp will light thereby indicating to the operator that the clutch has met its operational specifications.

BRIEF DESCRIPTION OF THE DRAWINGS

FIG. 1 is an illustration of the mechanical components of the clutch tester;
FIG. 2 is a timing diagram illustrating the signal output of the optical encoder;
FIG. 3 is a block diagram of the clutch testers circuitry;
FIG. 5 is a schematic diagram of the encoder pulse generator;
FIG. 6 is a schematic diagram of the timing circuit;
FIg. 7 is a schematic diagram of the clutch voltage controllers;
FIG. 9 is a schematic diagram of the hysteresis brake power supply circuit.

DETAILED DESCRIPTION OF THE INVENTION

Figure 4:
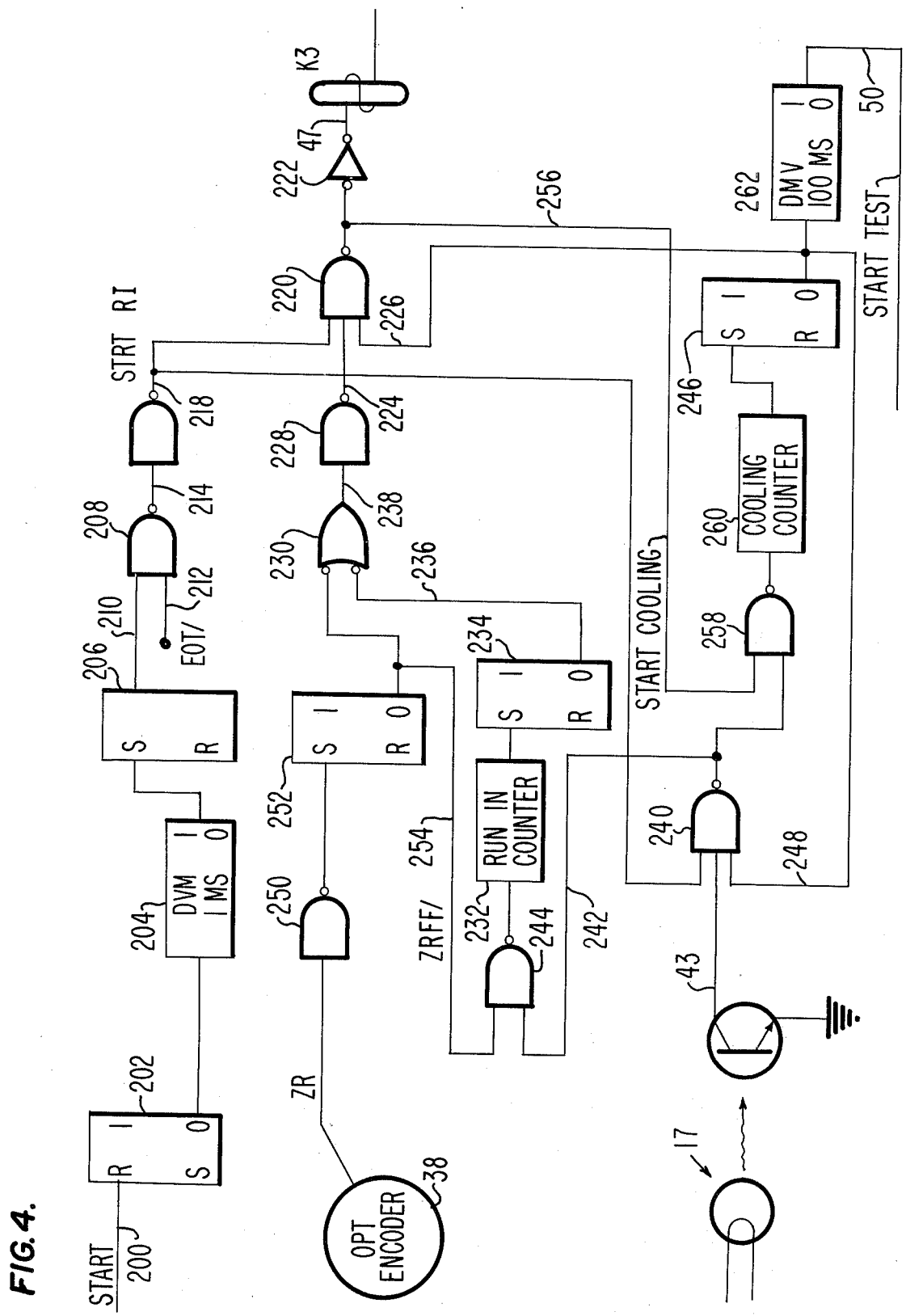
FIG. 4 is a schematic diagram of the run-in circuit.

In order to test an electrically actuated clutch for "pick-up" and 'release" time, it is necessary to provide a source of power to the drive portion of the clutch and at the same time provide load to the load portion of the clutch. In FIG. 1 of the drawing is illustrated the preferred embodiment of the test apparatus that provides both the driving force and the load to the clutch.

First, a motor (not shown) or some other source of rotational energy provides a constant speed source of power to the shaft 10. The rate of rotation of the shaft 10 is modified by the transmission 12 and the force transmitted by means of the belt 14 to the pulley 16. In the preferred embodiment of the final speed of the drive pulley 16 can be adjusted to conform to that of the end product, in which the clutch will ultimately be used, by means of adjusting or changing the sizes of the pulleys in the transmission 12.

Operably connected to the shaft 10 is a photo-electric device or meter count transducer 17 which is utilized to generate a series of electronic pulses each of which, in the preferred embodiment of the invention is used to represent a complete revolution of the motor. This device can also be attached anywhere else on the test apparatus of FIG. 1 such as the shaft 20, as long as it responds to the rotation of the motor. Since the motor will be rotating at a constant rate, the signals so generated by the photo-electric device 17 may be used for timing.

Power is then delivered to the clutch under test 18 by means of the drive shaft 20. The drive shaft 20 is secured to the drive portion of the clutch 18 so that the drive portion will rotate at the same speed as the drive shaft. Connected to the load portion of the clutch 22 is the load shaft 24. The load shaft 24 rotates independently of the drive shaft 20 so that the only time the load shaft 24 will rotate is when the load portion 22 of the clutch is rotating. In order to prevent the clutch as a whole and therefore the load portion 22 from rotating when the clutch is in a released state, the preferred embodiment of the invention includes a stop 26. The stop 26 is adjusted to abut an extension member 30 on the clutch 18 which is effective to keep the clutch as a whole from rotating.

Directly connected to the load shaft 24 are two hysteresis brakes 32 and 34. These brakes provide a constant load torque that is representative of the torque that the clutch will have to overcome in the end product. In the preferred embodiment the hysteresis brakes 32 and 34 are used as sources of load torque since the amount of load may be easily adjusted by changing the voltage input to the brakes. It should be noted at this point that the number of hysteresis brakes used may vary depending upon the amount of load required and the specifications of the brakes themselves. In addition to the brakes 32 and 34 a flywheel 36 also forms a part of the load on the shaft 24. This flywheel is selected on the basis of the inertia that the clutch will have to overcome when picking up to speed in the final product and the inertia of the rotating parts of the final product when the clutch is released. The flywheel 36 should have a moment of inertia such that when combined with the moment of inertia of the test of the load portion of the apparatus e.g. load shaft 24, it will approximate the moment of inertia of the end product. In summary, with respect to the hysteresis brakes 32 and 34 and the flywheel 36, these elements of the test apparatus are selected to most closely simulate the load environment of the clutch in the end product.

Also connected to the load shaft 24 of the apparatus illustrated in FIG. 1 is an optical incremental encoder 38. The function of the encoder 38 is to generate a signal that is proportional to the rate of rotation of the shaft 24. In the preferred embodiment of the invention the optical incremental encoder functions in a manner similar to the Baldwin 5V75 produced by the Baldwin Electronics Company of Little Rock, Ark. The signal produced on the output lines 40 of FIG. 1 by the optical encoder 38 are illustrated in FIG. 2. These binary square wave signals produce one pulse "A" of FIG. 2 for each degree of rotation of the shaft 24. The other signal "B" as illustrated in FIG. 2 is also generated for each degree of rotation of the shaft 24 but is delayed by one quarter of a cycle time. The frequency of the signals "A" and "B" of FIG. 2 will be proportionala to the speed of rotation of the load shaft 24. Along with the "A" and "B" signals, the encoder 38 generates a zero reference signal (ZR) on line 41. This signal represents one complete rotation of the shaft 24 and therefore the load portion of the clutch 22.

In FIG. 3, illustrated in block diagram form, is the electronic circuit for controlling the apparatus of FIG. 1. The electronic system shown in FIG. 3 responds to the signal generated by the optical encoder 38 as received over the lines 40 and 41. A pulse generator 31 associated with the photoelectric device 17 generates a series of signals over line 43 that are utilized as inputs to the Run-In Circuit 45. The Run-In Circuit 45 also accepts as input the zero reference signal (ZR) over line 41 from the optical encoder 38. These two signals are utilized by the Run-In Circuit 45 to control the "run-in" portion of the operation of the test apparatus. The output of the Run-In Circuit 45 activates the clutch voltage controller 56 in order to apply the run-in voltage to the clutch. This run-in voltage signal on line 47 serves to cause the clutch voltage controller 56 to apply enough voltage to the clutch so that there will be enough pressure applied to the faces to accomplish the burnishing.

The signals generated by the optical endoder 38 on lines 40 are used as input to the first module the encoder pulse generator 42. The output of the encoder pulse generator 42, the "EPO" signal is transmitted to the timing circuit 44 over the line 46. The "EPO" signal on line 46 is an indication as to whether or not the speed of rotation of the load portion of the clutch is above or below a predetermined value. The encoder pulse generator interprets the "A" and the "B" signals from the optical encoder and, for example, when during the pick-up portion of the test the rate of the load portion of the clutch 22 reaches a predetermined value, the EPO signal will go from low to high. By the same token, during the release portion of the test the EPO signal will change to low when the rate of rotation of the load portion of the clutch 22 drops below a predetermined rate.

The second module the timing circuit 44 responds to the start test signal 48 received over line 50 by producing a "pull strobe" signal on line 52. This signal will cause the encoder pulse generator to produce a high EPO signal on line 46 when the load portion of the clutch reaches a predetermined rate of rotation. Similarly the timing circuit 44 will generate a signal on the drop strobe line 54 for conditioning the encoder pulse generator so that during the release portion of the test the EPO signal will go low when the speed of the clutch falls below a predetermined value. The timing circuit will also produce a signal on line 53 just before the release portion of the test. This signal, delayed by the delay circuit 55, and then transmitted over line 57 to the Hysteresis Brake Power Supply 59 serves to reduce the load on the clutch just prior to performing the release portion of the test.

The third module of the test circuit as illustrated in FIG. 3 is the clutch voltage controller 56 which controls the level of actuating voltage applied to the clutch 18. The clutch voltage controller 56 is also responsive to the timing circuit 44, the start test signal 48 and the run-in signal on line 47. In response to the start test signal 48 the clutch voltage controller will initially apply the minimum voltage to the clutch 18 for the pick-up portion of the test. After the pick-up portion of the test has been performed as determined by the timing circuit 44, a "set volt" signal will be transmitted on line 58 from the timing circuit 44 to the clutch voltage controller 56. This signal will cause the clutch voltage controller to apply the maximum voltage to the clutch in preparation for the release portion of the test. After the maximum voltage has been given sufficient time to take full effect on the clutch the timing circuit will cause the clutch voltage controller, by means of a signal on line 60, to remove the actuating voltage altogether from the clutch. It is at this point that the release portion of the test is started.

The fourth module of the test circuit is the indicator control circuit 62 which receives its input from the timing circuit 44. If, for example, the clutch has not come up to speed during the pick-up portion of the test, the timing circuit, over line 64, will cause an op-fail flip flop in the indicator control circuit to set. By the same token, if the load portion of the clutch fails the release portion of the test, the timing circuit, over line 66, will cause the indicator control circuit to set a release-fail flip flop. When the time for the test has elapsed, as determined by the timing circuit 44, a signal will be generated on line 68 indicating the end of test resulting in the indicator control circuit 62 lighting the appropriate lamps. If the op-fail flip flop has been set, the op-fail lamp 70 will be lit as will the release-fail lamp 72 if the release fail flip flop has been set. On the other hand, if the clutch has passed both parts of the test successfully the pass lamp 74 will light along with the end of test lamp 76.

The logic elements of the circuit modules, shown in block form in FIG. 3, will be described in detail as follows. The first portion of the circuitry shown in FIG. 3 is the Run-In Circuit 45. In response to a start signal on line 200 (FIG. 4) the flip flop 202 sets thereby causing a triggering voltage drop to the delay multivibrator 204. After approximately 1 MS delay, in order to permit the various circuit elements to eliminate transients, the flip flop 206 will be set. The setting of the flip flop 206 produces a high input to the gate 208 on line 210 which, in combination with the high EOT/ signal on line 212, will produce a low signal on line 214. This signal is inverted by the NAND gate 216 thus producing a high signal on line 218. The high signal on line 218 has the effect of opening the NAND gate 220 which in turn activates the amplifier 222 thus generating a signal on line 47 causing the clutch voltage controller 56 to apply the run-in voltage to the clutch. As will be explained later, the other inputs to gate 220 will be high at this point in time so that a high signal on line 218 will have the effect of opening the gate.

Since at this point the motor is running and a load has been applied by means of the hysteresis brakes 34 and 36, the application of the run-in voltage will have the effect of running-in or burnishing the faces of the clutch. In addition to responding to the start voltage on line 218 the NAND gate 220 is also responsive to signals on lines 224 and 226. In order to apply the run-in voltage to the clutch 18 there must be high signals on each of the lines 218, 224 and 226. This will be the case when, after a suitable delay as above explained, the start signal is transmitted through the various circuit components on line 218.

The voltage on line 224 is the inverse, through the inverter 228, of the signal produced by the NOR gate 239. The primary function of the NOR gate 230 is to respond to both the ZR signal from the optical encoder 38 and the signal generated by the run-in counter 232.

Referring to the run-in counter 232 first, when it reaches a predetermined count representing a predetermined run-in time it will set the flip flop 234 which in turn generates a low signal on line 236. This generates a high signal on line 238 which when inverted by the invertor 228 will have the effect of shuting off the gate 220 thereby removing the run-in voltage from the clutch. Thus when the run-in counter 232 times out it will in effect terminate the run-in of the clutch 18. The run-in counter 232 itself responds to the pulse generator 31 which, in the preferred embodiment, is associated with a photo-electric device 17 that generates a plurality of signals directly proportional to the speed of the motor. These signals or pulses as generated on line 43 will be transmitted through the NAND gate 240 over line 242 through the NAND gate 244 to the run-in counter 232. The NAND gate 240 is responsive to the pulses on line 43 at this point in time since the start signal has resulted in the high signal on line 218 and the flip flop 246 is a reset condition thereby placing a high signal on line 248. The pulses from the pulse generator 17 will therefore be transmitted through the NAND gate 240 and the NAND gate 244 to the run-in counter 232. Since the shaft 20 of FIG. 1 is rotating at a constant rate, the cumulative number of pulses received at the run-in counter 232 will be an indication of the amount of elapsed time required for the run-in portion of the test. When the run-in counter reaches the predetermined number of pulses indicating that the run-in time has been completed, it will set the flip flop 234 which, as explained before, will have the effect of cutting off the run-in voltage to the clutch.

The preferred embodiment of the invention also makes provision for the eventuality that the faces of the clutch may be burnished to the desired degree before the run-in time has elapsed. In this case there will be sufficient friction developed between the clutch faces to rotate the load and hence the optical encoder 38. When the optical encoder has made a revolution, it will generate the zero reference (ZR) signal on line 41 which will be inverted by the gate 250 having the effect of setting the flip flop 252. When this occurs a low signal (ZRFF/) signal on line 254 will have two results: first, cutting off gate 244 thereby preventing the run-in counter 232 from being incremented and secondly, causing the NOR gate 230 to generate a high signal on line 238 which will have the effect of removing the run-in voltage from the clutch. Therefore it may be seen that the generating of a ZR signal on line 41 will have the effect of terminating the run-in portion of the test.

After the termination of the run-in phase of the test due either to the generation of a zero reference signal or the timing out of the counter 232, the cooling phase of the test beings. At the termination of the run-in a high signal will be generated by the NAND gate 220 on line 256. This will have the effect of opening the NAND gate 258 thereby permitting the pulses generated by the pulse generator 31 to be transmitted to the cooling countere 260. When the predetermined amount of time for cooling has elapsed and the cooling counter times out, it will set the flip flop 246 producing a low signal on line 226. At the termination of the cooling cycle, the low signal generated on line 226 will trigger the delay multivibrator 262 which after a delay of 100 MS will produce the start test signal on line 50. This start test signal on line 50 will initiate the actual performance testing of the clutch. Next, in FIG. 5 is illustrated the preferred embodiment of the logic circuitry for the encoder pulse generator 42 of FIG. 3. The encoder pulse generator as shown in FIG. 5 receives over line 40 the "A" and "B" portions of the signals shown in FIG. 2. These signals are input to the NAND gates 82, 80 and 84. The output of NAND gates 82 and 84 are used as input to the NAND gate 86. The effect of these gates on the signals A and B will be to cause a low signal on line 88 only when the A and B signal are both high. In a similar manner the only time a low signal will appear on the line 88 is when both the A and B signal are high. Therefore the effect of having both A and B high at the same time will be to set the flip flop 90. Therefore the net result of filtering the "A" and "B" signals through the NAND gates 80, 82, 84 and 86 will be to set and reset the flip flop 90 for each degree of rotation of the load portion 22 of the clutch.

Each time the flip flop 90 is reset, the negative going voltage on line 92 will trigger the delay multivibrator 94. When the delay multivibrator 94 has been triggered by the negative going voltage on line 92 it will produce a high signal on line 96 having a duration of one millisecond. For purposes of illustration, the delay time of the delay multivibrators used in the preferred emboidiment of the invention have been included in the drawing. It will be understood, however, that theses values for the delay multivibrators as well as the other circuit elements are a function of the characteristics of the particular clutch and the environment for which the clutch is being tested. Since the delay multivibrator 94 is triggered by the resetting of the flip flop 90, the signal on line 96 will be high continuously when the speed of the rotation of the clutch 38 is sufficient to cause the flip flop 90 to set and reset every one millisecond or less. Therefor when the clutch reaches the minimum pick-up speed, line 96 will have a steady high signal thereon and similarly the signal on line 98 will be continuous low.

During the pick-up portion of the test the pull strobe line 52 will have a high signal placed on it thus enabling the NAND gate 100. The effect of enabling the NAND gate 100 will be to cause the flip flop 102 to set when the speed of the rotation of the clutch 38 has reached a sufficient velocity to cause the delay multivibrator 94 to produce a continuous high signal on line 96. The purpose of the delay multivibrator 104 attached to line 96 is to provide a low signal on line 106 of at least 300 microseconds when the speed of rotation of the clutch 38 is slightly below the minimum pick up speed so that a low signal off the NAND gate 100 will be blocked long enough to prevent the flip flop 102 from being set. The overall function of the circuitry shown in FIG. 5 is to produce a high signal on the EPO line 46 when the clutch 38 has reached or exceeded the minimum test speed during the pick-up portion of the test.

The encoder pulse generator circuit in FIG. 5 operates in a similar manner during the release portion of the clutch test. During the release portion of the test, the drop strobe line 54 will be energized with a high signal. This will cause the NAND gate 108 to respond to the zero side of the delay multivibrator 94. When the clutch is not rotating or rotating very slowly, there will be constant high signal on line 98 which will have the effect of causing the NAND gate 108 to reset the flip flop 102. Therefore when the clutch 38 is stopped during the release portion of the test, the flip flop 102 will be reset and a low signal will be produced on the EPO line 46.

In summary with respect to the encoder pulse generator as illustrated in FIG. 5 it can be seen from the above discussion that the signal on the EPO line will give an indication of whether the clutch 38 has reached the predetermined minimum speed during the pick-up portion of the test, as evidenced by a high signal, and at the same time will give an indication as to whether the clutch 38 has stopped during the release portion of the test by producing a low signal on the EPO line 46.

In the detailed description of the preferred embodiment of the timing circuit 44 as set forth in FIG. 6, specific parameters are included for the delay multivibrators. However, it should be understood that these values, again are a function of the particular clutch under test and the ultimate environment in which that clutch will function and will of course be adjusted to conform to the specific conditions. The values given here are for illustration purposes only. The overall function of the timing circuit as shown in FIG. 6 is to provide signals for activating the other components of the test apparatus. At the beginning of the actual performance test of the clutch, when a start signal has been received over line 50, the first delay multivibrator 110 will produce a 20 millisecond pulse on line 112. At this point in time the minimum activating voltage will be applied to the clutch 18 and the 20 millisecond delay provided by the delay multivibrator 110 will give the clutch sufficient time to engage.

After 20 milliseconds the signal on line 112 will go low thus triggering the delay multivibrators 114 and 116. The delay multivibrator 116 will then produce a high signal on the line 52 for a period of approximately 450 microseconds which will, as discussed above, activate the NAND gate 100 of the encoder generator as shown in FIG. 4. If the clutch 18 is rotating at minimum speed or above the flip flop 102 will be set causing a high signal to be placed on the EPO line 46.

After the 450 microseconds has elapsed, the signal on line 52 will go low thereby triggering the delay multivibrator 118 and producing a high signal on the line 120 for 750 microseconds. During this same interval the delay multivibrator 114 will produce for 200 milliseconds a high signal on the line 122. As a result during the pick-up portion of the test, lines 120 and 122 will have a high voltage applied to them. At this point in the pick-up portion of the test, if the clutch has reached minimum speed, the EPO line 46 will have a high signal thereon, which will combine with the high signal on line 122 to open the NAND gate 124. Therefore if the clutch has reached minimum speed there will be a low signal on line 126. This low signal on line 126 will effectively block the NAND gate 128 from producing a low signal on line 64. However, if the clutch 18 has not reached the minimum speed during the pick-up portion of the test, a low signal on the EPO line 46 will result in the gate 124 producing a high signal on line 126. This will cause the NAND gate 128 to produce a low signal on line 64 indicating that the clutch has failed to come up to speed within the allotted time.

Figure 8:
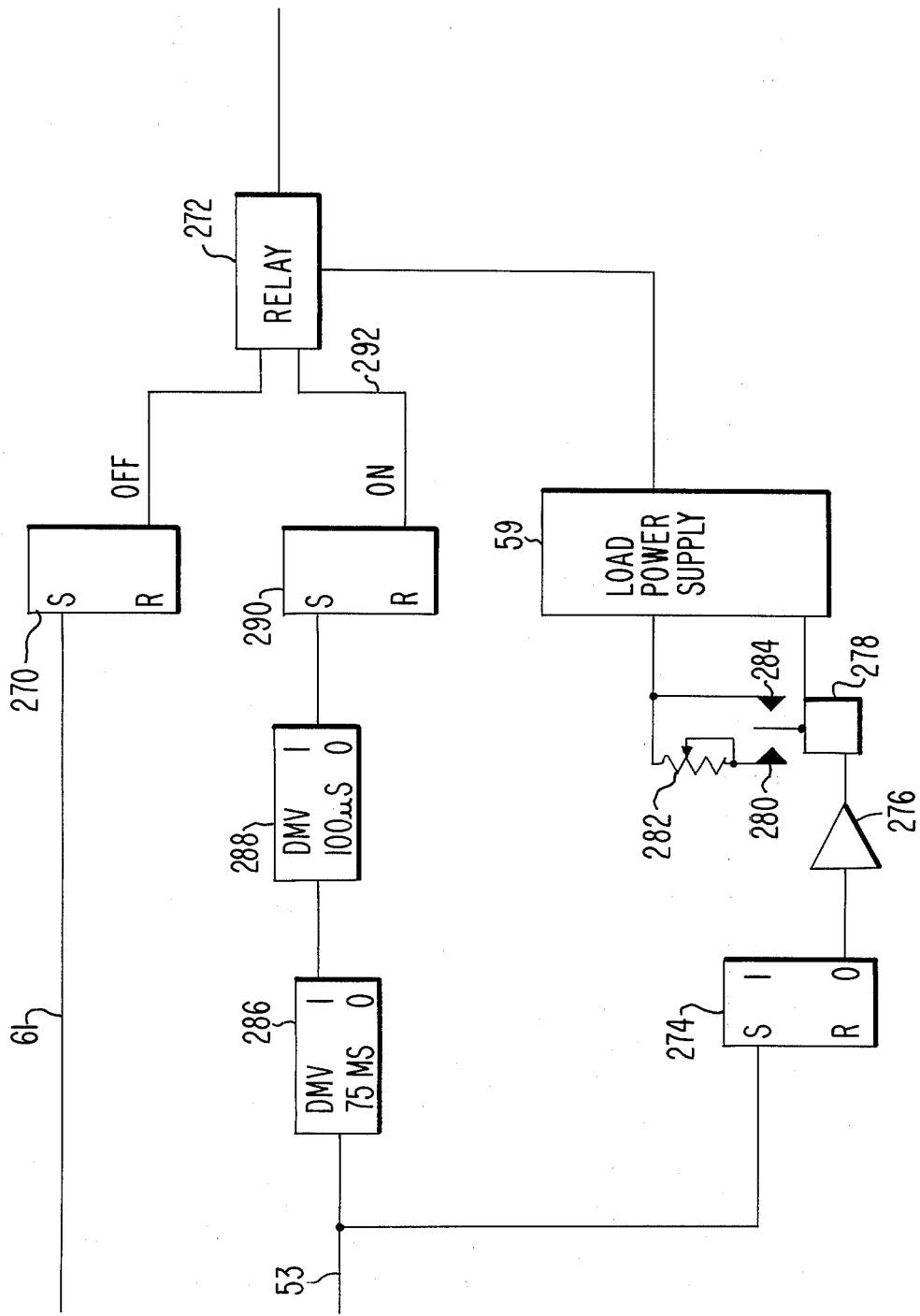
FIG. 8 is a schematic diagram of the lamp control circuit.

After the pick-up portion of the test has been completed, as measured by the delay multivibrator 118, the release portion of the test will automatically commence. Before the release portion of the test begins, it is desirable to reduce the load on the clutch. If the load on the clutch is maintained the same as in the pick-up portion of the test, the clutch will tend to release or stop rotating even though the clutch may be defective. In other words, the load on the clutch must be reduced to provide a realistic environment for testing the release performance of the clutch. In order to provide for such a reduction in the load the power supplied to the hysteresis brakes 34 and 36 of FIG. 1 must be reduced. The circuitry of FIG. 8 is included in the preferred embodiment to accomplish this end. The brake control circuitry of FIG. 8 responds to the timing circuit of FIG. 6. After completion of the pick-up portion of the test, a low signal on line 61 as produced by the delay multivibrator 116 will set the flip flop 270. This flip flop will cause the switch 272 to remove the brake power supply 59 from the hysteresis brakes 34 and 36 after a 150 MS delay as produced by the delay multivibrator 114. This delay allows the hysteresis brake to pass through zero thus eliminating any residual hysteresis effects in the brakes.

The delay multivibrator 130 of FIG. 6 generates a low signal on line 53 that serves to set the flip flop 274 of FIG. 8 which in turn cuts off the voltage supply to the amplifier 276. This termination of voltage to the driver 276 causes the relay 278 to make contact with the terminal 280. This will have the effect of introducing the variable resistance 282 into the brake power supply circuit thereby reducing the effective load produced by the hysteresis brake. During the pick-up portion of the test, the switch 278 will be in contact with the terminal 284 thereby providing a full load to the hysteresis brakes and thereby a full load to the clutch 18.

The low signal on line 53 will also trigger a 75 MS pulse by the delay multivibrator 286 which in turn will trigger the delay multivibrator 288. This results in the setting of the flip flop 290 approximately 75 MS after the output of the load power supply 59 has been reduced. After the flip flop 290 has been set, the low signal on lines 292 will cause the relay 272 to reconnect the brake power supply to the hysteresis brakes. In summary, the delay multivibrator 114 of FIG. 6 will provide a 150 millisecond time period for the hysteresis brakes to pass through a zero condition; the signal from the delay multivibrator 116 of FIG. 6 operates to reduce the output of the brake power supply; and lastly the delay multivibrator 292 of FIG. 8 will provide a 75 millisecond delay before the power supply is reconnected to the hysteresis brakes. Therefore the circuitry of FIG. 8 provides the means of reducing the effective load on the clutch for the release portion of the test.

Returning to the logic of FIG. 6 as it relates to the release portion of the test, the delay multivibrator 130 will respond to the zero side output of the delay multivibrator 114 and produce a pulse on line 132 having a duration of 10 milliseconds. At the completion of this 10 milliseconds, the delay multivibrator 134 will produce a pulse on the set voltage line 58 of approximately 100 microseconds. Again the set voltage is the highest voltage that is likely to be applied to the clutch in the end product. When this delay of 200 milliseconds, as measured by the delay multivibrator 114, is over the signal on the line 122 is going to zero will cause the delay multivibrator 136 to produce a 25 microsecond pulse on the drop volt line 60. The function of the drop volt line is to cause the actuating voltage to be removed from the clutch. The signal on line 122 is going to zero also will cause the delay multivibrator 138 to produce a 20 millisecond pulse on line 140. After this 20 millisecond delay, the delay multivibrator 142 will produce a 100 microsecond pulse on line 54.

The high signal on the drop strobe line 54 will then cause the encoder pulse generator of FIG. 4 to produce a signal on the EPO line 146 as previously described. In other words, when there is a high signal on the drop strobe line 54 and if the clutch 18 has essentially stopped rotating there will be a low signal on the EPO line 46. However, if the clutch has not stopped rotating, there will be a high signal on the EPO line 46 which is also used as input to the NAND gate 144. The delay multivibrator 146 will respond to the signal on the delay multivibrator 142 and produce a high signal on the line 146 after the 100 microsecond delay. If the clutch 18 has not stopped rotating, the combination of the high signal on line 46 and the high signal on line 146 will cause the NAND gate 144 to produce a low signal on the release fail line 66. In addition when the delay multivibrator 146 has a high output on line 148, as previously described, it will have a low output on the EOT line 68 thereby signaling the end of the test.

In FIG. 7 is illustrated the logic of the clutch voltage controller 56 of FIG. 3. The clutch voltage controller first responds to the start signal on line 50 as it is input to the flip flop 150. When the flip flop 150 is set, the amplifier 152 will be switched on thus applying the minimum voltage to the clutch 18. When the set voltage signal is received on line 58 from the timing circuit, the flip flop 154 will be set thereby causing additional voltage through amplifier 156 to be applied to the clutch. This addition voltage will correspond to the maximum anticipated voltage that the clutch will be subjected to in the end product. As indicated previously, during the release portion of the test a low signal will be produced on the drop volt line 60 which will cause the flip flop 150 to be reset thereby removing all of the voltage from the clutch.

The final portion of the circuitry, that is identified by block 62 in FIG. 3, is the indicator control circuit. This circuit is illustrated in schematic form in FIG. 9. If during the pick-up portion of the test the clutch fails to reach the predetermined minimum speed, the timing circuit 44 will produce a low signal on the op-fail line 64. This will cause the op-fail flip flop 158 to set and produce a high signal on line 160. In a similar fashion, if the clutch fails to release during the release portion of the test, a low signal will be generated on the release fail line 66 thereby causing the release fail flip flop 162 to set thus generating a high signal on line 164. When the test has been completed, the timing circuit 44 will produce a low signal on the end of that line 68 thus resetting the EOT flip flop 166 and producing a high signal on the line 168.

At the termination of the test, when a high signal is present on line 168, if the op-fail flip flop 158 has been set, the NAND gate 170 will open and cause the operate fail lamp to light. Similarly, if the release fail flip flop 162 is set, the NAND gate 172 will cause the release fail lamp 172 to light. However, in the event the clutch has passed both of the tests, i.e. neither the op-fail flip flop 158 nor the release fail flip flop 162 has been set, there will be a high signal on lines 174 and 176 which when combined with the EOT signal on 168 will cause the NAND gate 178 to open thereby causing the pass lamp 74 to become illuminated.

It should be apparent that the test circuit as set out in block diagram form in FIG. 3 and explained in detail in FIGS. 4, 5, 6 and 7 will completely control the pick-up and release test of the clutch 18 without the need for any operator intervention. In addition, the results of the test will, in the preferred embodiment, indicate the results of that test to an operator by means of indicator lamps 72, 74 and 76. Along with being apprised as to whether the clutch has met specification, the operator will have an indication of which portion of the test it has failed, i.e. the pick-up or release portion.

What is claimed is:

1. In an improved clutch test apparatus having drive means for rotating the drive portion of a clutch, a load connectible to the load portion of the clutch, and a clutch voltage controller for actuating the clutch during run-in and testing, the improvement comprising:
    pulse generating means for generating a plurality of pulses;
    run-in counter means responsive to said pulse generator means for timing the run-in of the clutch; and
    cooling counter means responsive to said pulse generator means for timing the cooling of the clutch.

2. The apparatus of claim 1 additionally including:
    zero reference signal generating means for generating a signal indicating that the load portion of the clutch has rotated a predetermined amount; and circuit means for terminating the run-in of the clutch in response to said zero reference signal.

3. The apparatus of claim 1 additionally including circuit responsive to a start signal to cause said clutch voltage controller to apply a run-in voltage to the clutch.

4. The apparatus of claim 1 additionally including circuit means, responsive to a time-out signal from said run-in counter means, for removing the run-in voltage from the clutch and activating said cooling counter means.

5. The apparatus of claim 1 wherein said pulse generating means is a photoelectric device that generates applied that are proportional to the speed of rotating of said drive means.

6. In an improved clutch test apparatus having: drive means for rotating a clutch and a clutch voltage controller wherein the improvement comprises:
pulse generating means for generating a plurality of pulses that are representative of elapsed time;
run-in counter means responsive to said pulse generator means for timing the run-in of the clutch;
zero reference signal generating means for generating a zero reference signal indicating that the load portion of the clutch has rotated a predetermined amount;
circuit means for terminating the run-in of the clutch when said zero reference signal has been generated; and
cooling counter means responsive to said pulse generator means for timing the cooling of the clutch.

7. In an improved clutch test apparatus having: drive means for rotating a clutch and a clutch voltage controller wherein the improvement comprises:
pulse generating means for generating a continuous series of pulses that are representative of elapsed time;
first circuit means responsive to a start signal for causing said clutch voltage controller to apply a run-in voltage to the clutch;
run-in counter means responsive to said pulse generator means for timing the run-in of the clutch and generating a time-out signal;
a second circuit means responsive to said time-out signal for removing the run-in voltage from the clutch;
zero reference signal generating means for generating a zero reference signal indicating that the load portion of the clutch has rotated a predetermined amount;
third circuit means for terminating the run-in of the clutch when said zero reference signal has been generated; and cooling counter means responsive to both said run-in counter means and said third circuit means, for timing the cooling of the clutch.

8. The apparatus of claim 7 wherein said pulse generating means is a photo-electric device that generates pulses that are proportional to the speed of rotation of said drive means.

9. In an improved clutch testing apparatus having: a timing circuit, hysteresis brakes for applying a load to the clutch to be tested, and a power supply for activating the hysteresis brakes wherein the improvement comprises:
switch means, responsive to the timing circuit for disconnecting and connecting the power supply to the hysteresis brakes: and
power supply reduction means, responsive to the timing circuit, for reducing the load on the load portion of the clutch by reducing the amount of power supplied to the hysteresis brakes.

10. The improved clutch test apparatus of claim 9 wherein said power reduction means includes:
variable resistance means for reducing the power supplied by said brake power supply; and
a power supply relay, responsive to the timing circuit for switching the power supply to said variable resistance.

11. In an improved clutch test apparatus having: drive means for rotating a clutch, a clutch voltage controller, timing circuits, hysteresis brakes for applying a load to the clutch, and a power supply for activating the hysteresis brakes wherein the improvement comprises:
pulse generating means for generating a plurality of pulses that are representative of elapsed time;
run-counter means responsive to said pulse generator means for timing the run-in of the clutch;
zero reference signal generating means for generating a zero reference signal indicating that the load portion of the clutch has rotated a predetermined amount;
circuit means for terminating the run-in of the clutch when said zero reference signal has been generated;
cooling counter means responsive to said pulse generator means for timing the cooling of the clutch;
switch means, responsive to the timing circuit, for disconnecting and connecting the power supply to the hysteresis brakes; and
brake power supply reduction means, responsive to the timing circuit for reducing the load on the load portion of the clutch by reducing the amount of power supplied to the hysteresis brakes.

* * * * *